(12) United States Patent
Kim

(10) Patent No.: US 10,232,731 B2
(45) Date of Patent: Mar. 19, 2019

(54) BATTERY PACK MANAGEMENT SYSTEM WITH SELECTIVE BATTERY MODULE HEATING

(71) Applicant: Atieva, Inc., Menlo Park, CA (US)

(72) Inventor: Jong Yon Kim, San Francisco, CA (US)

(73) Assignee: ATIEVA, INC., Newark, CA (US)

(*) Notice: Subject to any disclaimer, the term of this patent is extended or adjusted under 35 U.S.C. 154(b) by 135 days.

(21) Appl. No.: 15/583,757

(22) Filed: May 1, 2017

(65) Prior Publication Data
US 2017/0232864 A1    Aug. 17, 2017

Related U.S. Application Data

(62) Division of application No. 14/793,959, filed on Jul. 8, 2015, now Pat. No. 9,758,053.

(51) Int. Cl.
| | |
|---|---|
| *H01M 10/46* | (2006.01) |
| *B60L 11/18* | (2006.01) |
| *B60L 1/02* | (2006.01) |
| *B60L 1/14* | (2006.01) |
| *H02J 7/00* | (2006.01) |
| *H01M 10/42* | (2006.01) |
| *H01M 10/44* | (2006.01) |
| *H01M 10/48* | (2006.01) |
| *H01M 10/625* | (2014.01) |
| *H01M 10/615* | (2014.01) |

(52) U.S. Cl.
CPC .......... *B60L 11/1866* (2013.01); *B60L 1/02* (2013.01); *B60L 1/14* (2013.01); *B60L 11/1861* (2013.01); *B60L 11/1872* (2013.01); *B60L 11/1875* (2013.01); *H01M 10/425* (2013.01); *H01M 10/443* (2013.01); *H01M 10/48* (2013.01); *H01M 10/615* (2015.04); *H01M 10/625* (2015.04); *H02J 7/0026* (2013.01); *H01M 2010/4271* (2013.01); *H01M 2220/20* (2013.01); *Y02T 10/7005* (2013.01); *Y02T 10/7044* (2013.01); *Y02T 10/7061* (2013.01)

(58) Field of Classification Search
CPC ........ H02J 7/0091; H02J 7/005; H02J 7/0021; H02J 7/047
USPC ................. 320/112, 114, 116, 132, 150, 153
See application file for complete search history.

(56) References Cited

U.S. PATENT DOCUMENTS

| | | | |
|---|---|---|---|
| 5,889,385 A | 3/1999 | Podrazhansky | |
| 7,327,122 B2 | 2/2008 | Kamenoff | |
| 9,403,527 B2 | 8/2016 | Magnet | |
| 2009/0139781 A1* | 6/2009 | Straubel | ............... B60L 11/1875 180/65.1 |
| 2015/0280294 A1 | 10/2015 | Shin | |
| 2016/0141734 A1 | 5/2016 | Bui Van | |

* cited by examiner

*Primary Examiner* — Edward Tso
(74) *Attorney, Agent, or Firm* — Patent Law Office of David G. Beck

(57) ABSTRACT

A system is provided that selectively heats the battery or battery module with the lowest voltage when the battery pack is at a low charge level, thereby decreasing the internal resistance and mitigating the magnitude of the voltage drop of the affected battery/battery module. As a result, termination of the battery pack's discharge cycle is delayed and the driving range of the vehicle is increased, thereby giving the driver a little more time and driving range to reach a charging station.

8 Claims, 6 Drawing Sheets

BATTERY PACK MANAGEMENT SYSTEM WITH SELECTIVE BATTERY MODULE HEATING

CROSS-REFERENCE TO RELATED APPLICATION

This application is a continuation of U.S. patent application Ser. No. 14/793,959, filed 8 Jul. 2015, the disclosure of which is incorporated herein by reference for any and all purposes.

FIELD OF THE INVENTION

The present invention relates generally to an electric vehicle and, more particularly, to a system that provides increased driving range when the vehicle's battery pack is at a low charge level.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at reduced levels compared to conventional vehicles. Additionally, due to the inclusion of both an internal combustion engine and an electric motor(s) with its accompanying battery pack, the drive train of a hybrid vehicle is typically much more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

The electric drive trains used in electric vehicles (EVs) have proven to be highly reliable and capable of providing exceptional performance. Unfortunately car sales for EVs have proven to be lower than one would expect, especially given the performance and reliability of these cars. It appears that these sluggish sales are due, at least in part, to the concerns of some potential buyers regarding an EV's driving range. Accordingly, what is needed is a means for increasing driving range under emergency circumstances, i.e., when the battery charge level is approaching zero percent. The present invention provides such a system.

SUMMARY OF THE INVENTION

The present invention provides a battery management system coupled to a battery pack of an electric vehicle, where the battery pack is comprised of a plurality of battery modules with each battery module comprised of at least one battery, the battery management system comprising (i) a battery pack thermal control system comprised of a heating subsystem and a cooling subsystem, where the battery pack thermal control system is configured to simultaneously heat the plurality of battery modules with the heating subsystem upon receipt of a heating command and simultaneously cool the plurality of battery modules with the cooling subsystem upon receipt of a cooling command; (ii) a battery module heating system that is independent of the battery pack thermal control system and configured to provide selective heating of a single battery module of the plurality of battery modules; (iii) a battery management system controller, where both the battery pack thermal control system and the battery module heating system are coupled to and controlled by the battery management system controller, and where the battery management system controller is configured to (i) monitor the current battery pack charge level, (ii) determine when the current battery pack charge level falls to a preset level, (iii) determine an output voltage for each battery module, (iv) identify the single battery module from the plurality of battery modules based on the output voltage, where the output voltage of the single battery module is lower than the output voltage of each battery module of the remaining portion battery modules, and (v) selectively heat the single battery module to a higher temperature than the remaining portion of battery modules when the current battery pack charge level falls to the preset level, where the heating step decreases the internal resistance of the single battery module. The system may include a plurality of sensors that monitor the output voltage corresponding to each battery module. The system controller may determine the output voltage of each battery module from the corresponding module's internal resistance. The system may include an on-board warning indicator that is activated by the controller when the current battery pack charge level falls to the preset level. The system may be configured to reduce a battery pack load after the current battery pack charge level falls to the preset level. The system may be configured to automatically alter a vehicle auxiliary system setting in order to reduce the battery pack load after the current battery pack charge level falls to the preset level, where the vehicle auxiliary system is selected from the group consisting of a HVAC system, an external lighting system, an internal lighting system, a navigation system and a vehicle entertainment system. The system may be configured to limit a motor load corresponding to the electric drive train in order to reduce the battery pack load after the current battery pack charge level falls to the preset level, where limiting the motor load reduces electric vehicle acceleration and top speed. The system may be configured to issue a confirmation request prior to selectively heating the single battery module to the higher temperature, where the battery management system controller selectively heats the single battery module after receiving a positive response to the confirmation request and does not selectively heat the single battery module after receiving a negative response to the confirmation request.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably.

Figure 1:
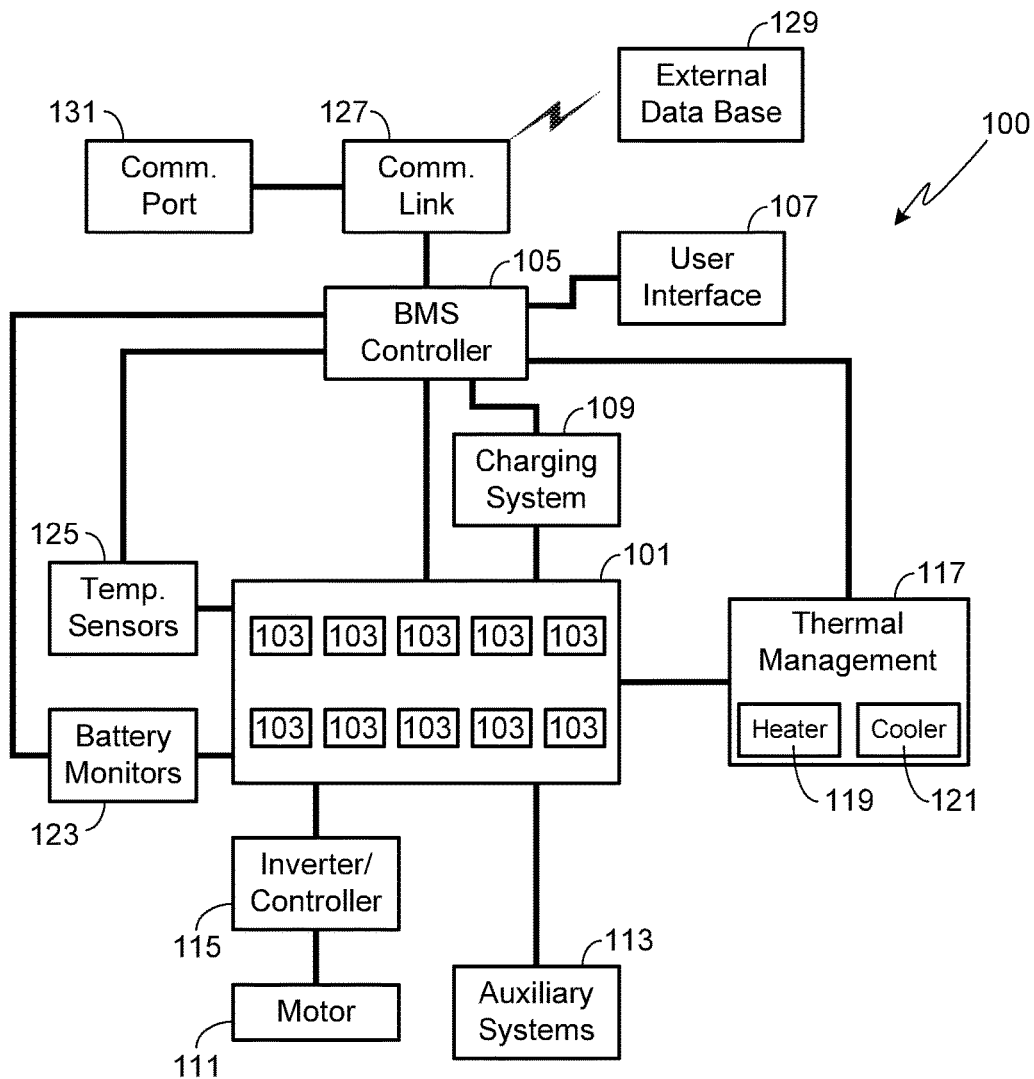
FIG. 1 provides a system level diagram of a battery management control system.

FIG. 1 provides a block diagram representing a battery management system (BMS) 100 coupled to a typical EV battery pack 101. It should be understood that the present invention is not limited to a specific battery pack configuration, mounting scheme, or battery pack size. Additionally, it should be understood that the invention is not limited to a battery pack comprised of batteries of a particular chemistry or form factor, and the battery pack may be comprised of tens, hundreds, or thousands of individual batteries connected in parallel, series, or in a series-parallel manner to yield the desired voltage and capacity (kW-h). Exemplary interconnect configurations are disclosed in co-assigned U.S. patent application Ser. No. 13/794,535, filed 11 Mar. 2013, and Ser. No. 14/203,874, filed 11 Mar. 2014, the disclosures of which are incorporated herein for any and all purposes. In at least one preferred embodiment, individual batteries are connected in series to form battery groups or modules 103, and groups/modules 103 are connected in series to form battery pack 101. In addition to being useful as a means of obtaining the desired voltage/capacity, separately packaging the groups/modules simplifies battery pack fabrication, assembly, testing and repair. Note that in order to simplify the figure, individual battery and/or module interconnects are not shown in FIG. 1.

BMS 100 includes a BMS controller 105 comprised of a microprocessor. BMS controller 105 may be independent of, or integral to, the vehicle management system. BMS controller 105 also includes memory for storing data and processor instructions, with the memory being comprised of EPROM, EEPROM, flash memory, RAM, solid state drive, hard disk drive, or any other type of memory or combination of memory types. A user interface 107 is coupled to BMS controller 105, interface 107 providing a means for the BMS controller, either directly or via a vehicle management system, to provide information to the driver, information such as the vehicle's current driving range and current battery capacity. Interface 107 may also be used to provide warnings to the driver, e.g., low battery capacity, reduced vehicle functionality due to low battery capacity, battery temperature exceeding desired operating range, etc. Preferably interface 107 also provides a means for the driver to control aspects of the system, for example selecting a mode of vehicle operation (e.g., performance, extended range, extended battery lifetime, etc.) and/or controlling the charging system 109 (e.g., charge rate). Of course interface 107 may also be configured for use in controlling other aspects of the vehicle such as the vehicle's navigation system, HVAC system, entertainment system (e.g., radio, CD/DVD player, etc.), and the internal/external lights. Interface 107 may be comprised of a single interface, for example a touch-screen display, or a combination of user interfaces such as push-button switches, capacitive switches, slide or toggle switches, gauges, display screens, visible and/or audible warning indicators, etc. It will be appreciated that if user interface 107 includes a graphical display as preferred, controller 105 may also include a graphical processing unit (GPU), with the GPU being either separate from or contained on the same chip set as the CPU.

Battery pack 101 supplies energy to one or more motors 111 utilized by the vehicle's drive train. Preferably battery pack 101 is also connected to the various vehicle auxiliary systems 113 that require electrical power (e.g., lights, entertainment systems, navigation system, etc.). Typically battery pack 101 is coupled to the motor(s) 111 via a power control system 115 (i.e., an inverter and motor controller) that insures that the energy delivered to the drive motor(s) is of the proper form (e.g., correct voltage, current, waveform, etc.).

BMS controller 105 controls a thermal management system 117 that includes both a heating subsystem 119 and a cooling subsystem 121. Thermal management system 117 is used by BMS controller 105 to insure that the batteries within battery pack 101 are maintained within the batteries' desired operating, charging and/or storage temperature ranges. When system 117 is used to control the temperature of battery pack 101, the system may utilize heated or cooled air, circulating the heated or cooled air throughout the battery pack; alternately, a coolant circulation system may be thermally coupled to the battery pack, where the coolant is heated by heater 119 or cooled by cooler 121 as required.

BMS controller 105 is also coupled to a variety of sensor systems, thus allowing it to monitor battery pack performance and make adjustments as necessary. For example, controller 105 is coupled to sensors 123 that allow the battery pack to be characterized, e.g., state-of-charge (SOC) and/or state-of-energy (SOE), battery/module voltage, etc. Sensors 123 may also be used to collect battery and battery pack data such as charging frequency, charging level, and charge rate. Controller 105 is also coupled to temperature sensors 125 that monitor the temperature of battery pack 101, for example during charging, discharge (i.e., use) and storage. Using the temperature data acquired via sensors 125 allows the controller to make adjustments to thermal management system 117, thus insuring that the batteries remain within the desired temperature range. Temperature sensors 125 may monitor battery temperature at the individual battery level; alternately, battery temperature may be monitored for a group of batteries, for example batteries mounted within the pack in close proximity to one another; alternately, battery temperature may be based on the temperature of the thermal transfer fluid (e.g., coolant) used by thermal management system 117 to control battery pack temperature; alternately, battery temperature may be based on the temperature of the air exiting the battery pack. It should be understood that other techniques may be used to monitor battery/battery pack temperature and the invention is not limited to a specific technique.

Preferably BMS controller 105 is also coupled to a communication link 127 that may be used to obtain system and/or configuration updates, transmit battery pack data to the vehicle's manufacturer, etc. As such, communication link 127 may be used to provide a communication link between the BMS controller 105 and an external data source (e.g., manufacturer, dealer, service center, web-based application, remote home-based system, third party source, etc.) and/or access an external data base 129, for example a data base maintained by the car's manufacturer or a third party. Link 127 may use any of a variety of different technologies (e.g., GSM, EDGE, UMTS, CDMA, DECT, WiFi, WiMax, etc.). Communication link 127 may also include an on-board port 131, such as a USB, Thunderbolt, or other port, thus allowing wired communication between BMS controller 105 and an external data base or system.

A BMS system such as that shown in FIG. 1 is required to minimize battery pack degradation, i.e., the unintentional and/or rapid decrease of battery lifetime, and to prevent battery abuse that may lead to thermal runaway events, an incident that rechargeable batteries are prone to in which the battery's internal reaction rate increases to such an extent that it is generating more heat than can be withdrawn. To achieve these goals, the BMS system insures that the batteries are properly charged and discharged (i.e., neither overcharged nor unnecessarily subjected to deep discharge); maintained within the desired temperature range during use, storage and charging; and monitored for short circuits and thermal runaway events.

While the primary function of the BMS system is to maintain battery pack health, the system may be configured in a variety of ways depending in large part on the design and performance goals set for the particular EV in question. For example, some vehicles may be configured to optimize battery pack lifetime and as such, are configured to prevent the battery pack charge level, given in terms of SOC or SOE, from being charged to the maximum level (i.e., 100%) or being discharged to 0% since either overcharging or deep discharging may dramatically affect battery health. In such a configuration, in order to extend battery life the BMS controller will typically stop charging the battery pack at an upper limit (e.g., 80%) that is substantially less than the battery pack's maximum capacity, and will prevent the battery pack from being discharged to a level lower than a preset lower limit (e.g., 20%). In an alternate configuration designed to optimize range at the expense of battery lifetime, a vehicle may be configured to more fully utilize the battery pack, i.e., allowing discharge to a much lower SOC/SOE and charging to full, or near full, capacity. In yet other configurations, the user may be given the option of selecting between various modes of operation, for example between a mode that maximizes battery life versus a mode that maximizes driving range, thereby allowing the user to alter the way in which the battery pack is utilized based on current driving needs.

Another function of the BMS controller is to balance the battery pack since an imbalanced pack leads to a reduction in the effective battery pack capacity, where the reduction is proportional to the difference between the minimum and maximum SOC/SOE levels of the batteries/modules in the pack. The reduction in battery pack capacity is due to some of the batteries not being fully charged during pack charging and other batteries not being fully discharged during the pack's discharge cycle. Accordingly, the BMS controller is typically configured to balance the battery pack when the charge levels in different batteries, or within different groups of batteries (e.g., battery modules), are unequal (within a preset tolerance range). Although not required, typically balancing is done when the pack is fully charged since at this point it is easier to accurately measure the SOC/SOE of the batteries/battery modules, at least in part due to the discharge curve of a battery being substantially flat in the mid-SOC range, thereby making it harder to note battery-to-battery (or module to module) voltage variations.

Even if the batteries within a battery pack are substantially matched when the pack is first manufactured, over time the spread between the highest and lowest battery/module charge levels increases, primarily due to variations in the batteries, e.g., variations in cell and component dimensions as well as compositional variations in the various battery elements (i.e., electrodes, electrolytes, etc.). Even locational variations in the battery pack can lead to battery imbalance issues since the batteries at different locations within the pack will typically be subjected to at least minor temperature variations.

In a typical EV, the BMS controller and the battery pack are configured to operate within a preset charge range, i.e., between a preset minimum SOC/SOE and a preset maximum SOC/SOE. As noted above, the values for these minimum and maximum charge levels are typically set by the vehicle's manufacturer and are based on the design goals (e.g., driving range, battery lifetime) for the car in question. In some EVs, however, the user may be allowed to adjust these preset charge levels, for example in order to maximize battery lifetime, extend the vehicle's driving range, etc. Typically in this situation the car has a nominal set of charge level presets which the user is able to temporarily alter, for example for a particular period of time. Most EVs, regardless of the BMS configuration, activate a low battery warning (e.g., indicator on the dash, audio sound, etc.) when the battery pack charge level reaches some preset value (e.g., 20% SOC/SOE). This low battery warning, which is basically equivalent to the low fuel warning light that is activated in a conventional car when the gas in the tank reaches a certain level, indicates that the user should charge the battery pack soon. In many EVs if the user continues to operate the car for too long after the initial warning is activated, a second preset charge level will be reached (e.g., 10% SOC/SOE), lower than the first, causing activation of a second warning indicator (e.g., visual or audible warning). In addition to a second indicator, in some EVs battery pack usage may be varied from the norm in order to give the driver as much driving range as possible. For example, the system may automatically shut down auxiliary systems that are drawing power from the battery (e.g., entertainment system, navigation system, passenger cabin HVAC system, non-necessary lights) and may also limit the power to the motor, thus causing the car to travel at a reduced rate as well as limiting acceleration. Alternately, some vehicles may reduce pack usage in stages, for example initially shutting down auxiliary systems, then limiting power to the motor.

In a typical EV, the BMS controller is configured to maintain the balance of the batteries/battery modules within the car's battery pack as noted above. Unfortunately as the battery pack charge level approaches zero, the system becomes more sensitive to charge variations within the battery pack, a condition which may lead to the premature termination of vehicle operation. More specifically, when the voltage of one of the pack's batteries or battery modules becomes too low and reaches its cutoff voltage, the BMS controller will stop the battery/module from discharging further which, in turn, terminates the discharge cycle of the battery pack. Since the vehicle's driver is unlikely to be at this charge level by choice, terminating vehicle operation any earlier than absolutely necessary may lead to dire consequences for the driver, e.g., abandoning their vehicle prior to reaching the desired charging station.

In accordance with the invention, when the battery pack is at a low charge level, the battery or battery module with the lowest voltage (i.e., the weakest battery or battery module) is selectively heated, thereby decreasing the battery's, or battery module's, internal resistance (DCR) and mitigating the magnitude of the voltage drop for that battery or battery module. As a result, termination of the battery pack's discharge cycle is delayed. As a result, the driving range of the vehicle is increased and the driver is provided a little more time and driving range to reach a charging station. Given that selective heating as described above may negatively impact the health of the heated battery/battery module as well as potentially cause an imbalance in the battery pack, selective heating is only performed when absolutely necessary, i.e., when the battery pack SOC (or SOE) is very low as evidenced by the battery pack charge level falling to a preset SOC (or SOE) level.

Figure 2:
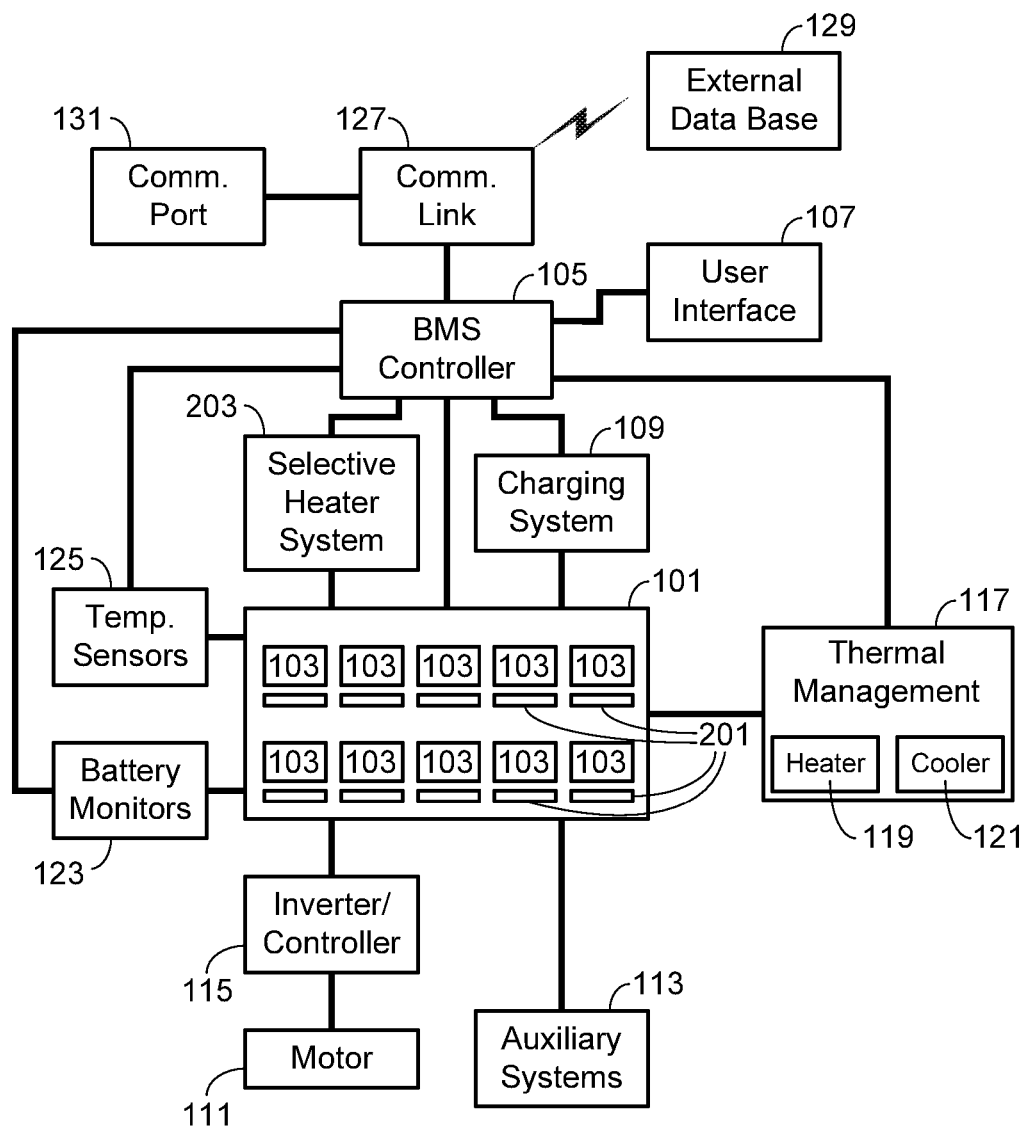
FIG. 2 provides the system level diagram of FIG. 1, modified to include the selective heaters of the present invention.

FIG. 2 provides the same block diagram shown in FIG. 1, modified to include a plurality of heaters 201. Each heater 201 corresponds to a specific battery or, as preferred, each heater 201 corresponds to a group (e.g., module) of batteries. Heater controller 203 allows a single heater 201 to be selectively activated as required by BMS controller 105, thus only heating the battery, or battery module, identified by BMS controller 105 as the low voltage battery/module. Preferably heaters 201 are separate and independent of thermal management system 117, where thermal management system 117 provides thermal control (e.g., heating and cooling) of the entire battery pack 101 while heaters 201 only provide selective and controllable heating of a specific battery or battery module 103 within pack 101.

Figure 3:
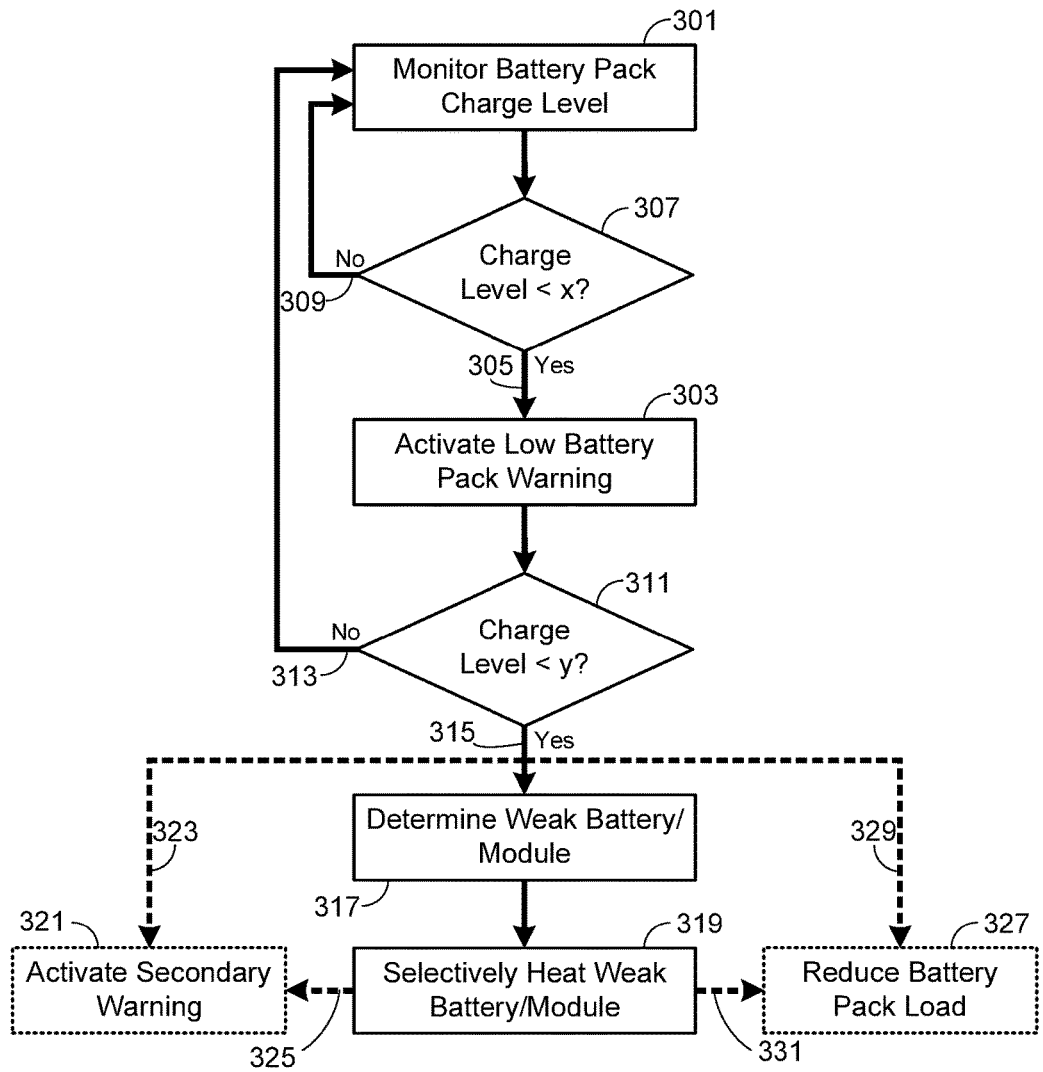
FIG. 3 illustrates a preferred methodology based on the system shown in FIG. 2.

FIG. 3 illustrates the basic methodology of the invention. As shown, during vehicle operation the current battery pack's charge level (e.g., SOC or SOE) is continuously monitored (step 301). Although not required by the invention, preferably the system includes a low battery charge level warning as previously described that is activated (step 303) when the charge level falls below a preset level (e.g., 20% SOC or SOE) (step 305). As long as the charge level remains above the preset level used in step 307, the system simply continues to monitor the battery pack charge level (step 309). If the charge level continues to fall due to continued vehicle use without stopping to charge the battery pack, the charge level is compared to a second preset level (step 311). Since the second preset level is used to activate selective battery/battery module heating, preferably this level is set at a relatively low charge level, e.g., less than 20%, preferably less than 15%, more preferably less than 10%, and still more preferably less than 5%. As long as the battery pack charge level remains above the second preset level (step 313), the system continues to operate as normal. Once the charge level falls below the second preset level (step 315), BMS controller 105 determines the battery or battery module 103 that is exhibiting the lowest voltage characteristics (step 317). Step 317 may be achieved by determining the actual voltage characteristics, or by determining an associated battery characteristic. For example, during step 317 the DCR of each battery/battery module may be determined, where the weak battery/battery module is the one exhibiting the highest DCR. Once the weak battery/battery module is determined, BMS controller 105 selectively heats the identified battery/battery module using one of the heaters 201 (step 319), thereby improving the voltage characteristics of the identified battery/battery module and delaying termination of vehicle operation. Although not required by the invention, preferably the system activates a secondary warning (step 321) either prior to (step 323), or concurrent with (step 325), activation of the battery heater 201, thus warning the driver of the low charge level. Since the secondary warning (step 321) is not required by the invention, rather inclusion of this step is a modification of the basic process, it is shown in phantom (dashed lines).

In addition to identifying and selectively heating the weakest battery or battery module in pack 101 in order to increase driving range by delaying discharge termination, the system may be configured to reduce the load on the battery pack (step 327), thereby further extending driving range and vehicle operation. If the system is configured to reduce battery pack loading, step 327 may either be performed prior to (step 329), or concurrent with (step 331), activation of the battery heater 201. In order to decrease battery pack loading, various auxiliary systems may be shut down (e.g., entertainment system, navigation system, passenger cabin HVAC system, non-necessary lights, etc.) and power to the motor may be limited, thereby limiting vehicle acceleration and top speed. Since the invention does not require the step of reducing the load on the battery pack (step 327), rather inclusion of this step is a modification of the basic process, it is shown in phantom (dashed lines).

Figure 4:
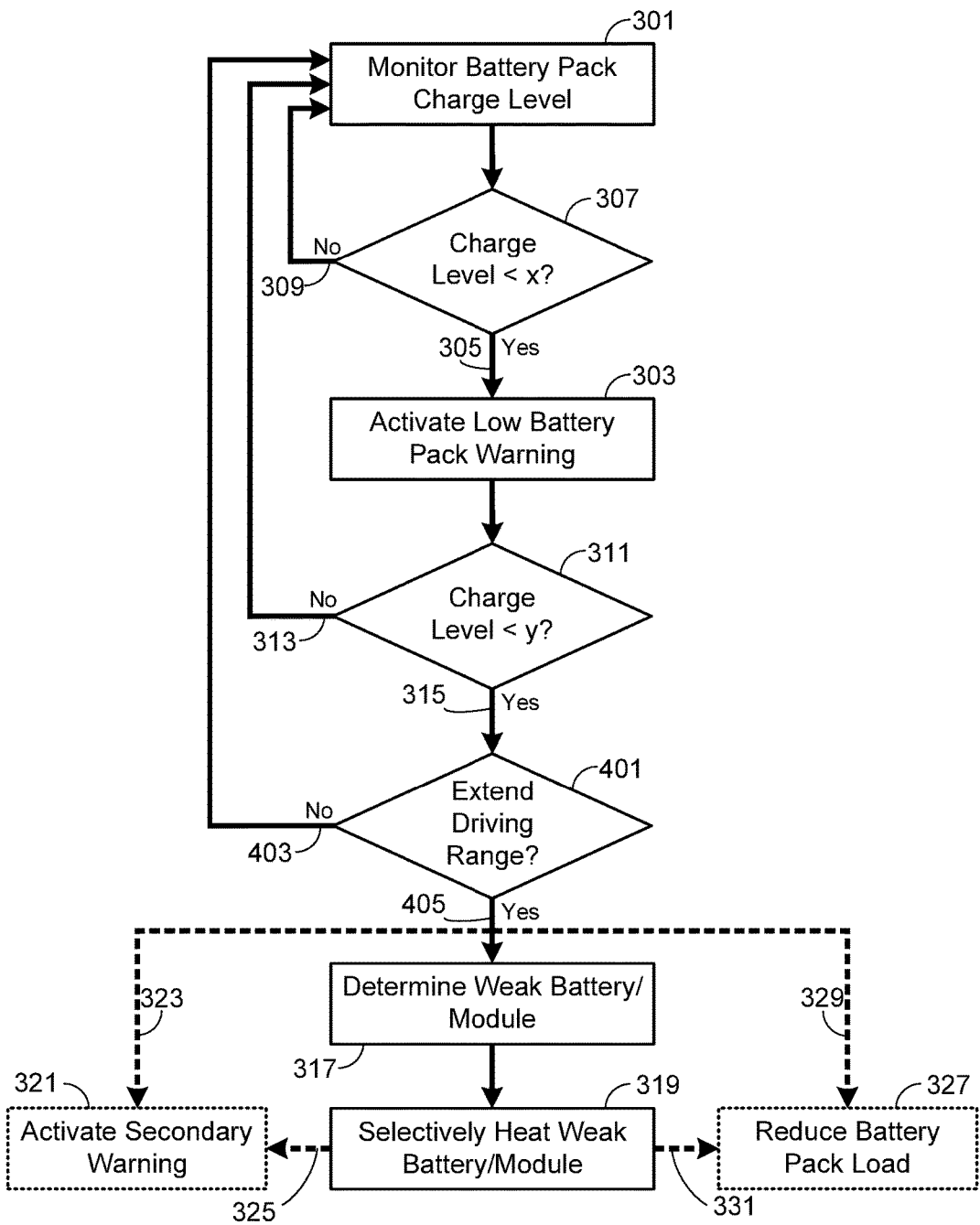
FIG. 4 illustrates a modification of the methodology shown in FIG. 3 in which user confirmation is requested prior to selectively heating a portion of the battery pack.

FIG. 4 illustrates a modification of the process shown in FIG. 3. As shown, after the charge level is reduced to the second preset level (step 315), the system requests user confirmation (step 401) prior to heating the weakest battery/battery module. Preferably the controller issues the confirmation request via user interface 107, although an audible confirmation request may also be issued, for example using the vehicle's audio system. The driver may be required to respond audibly using a voice recognition system, or may respond by selecting the appropriate response via interface 107 (e.g., using a touch-sensitive buttons on a touch-sensitive screen, or using a physical button or toggle switch). By issuing a confirmation request prior to proceeding with selective battery/module heating, unnecessary battery heating may be avoided. For example, the user may be within close proximity to a charging station and therefore may not require the extended driving range afforded by selectively heating the weakest battery/module. If the driver indicates in response to step 401 that an extension to the driving range is not required (step 403), the system continues to operate as normal until either the battery pack is plugged into a charging station or car operation is terminated due to the low charge level of the battery pack. If the driver indicates in response to step 401 that an extension to the driving range is desired (step 405), then the battery/battery module exhibiting the lowest voltage characteristics is identified (step 317) and selectively heated (step 319). As previously noted, a secondary warning (step 321) may or may not be activated, depending upon the system's configuration. Similarly, the system may or may not be configured to reduce the load on the battery pack (step 327).

Figure 5:
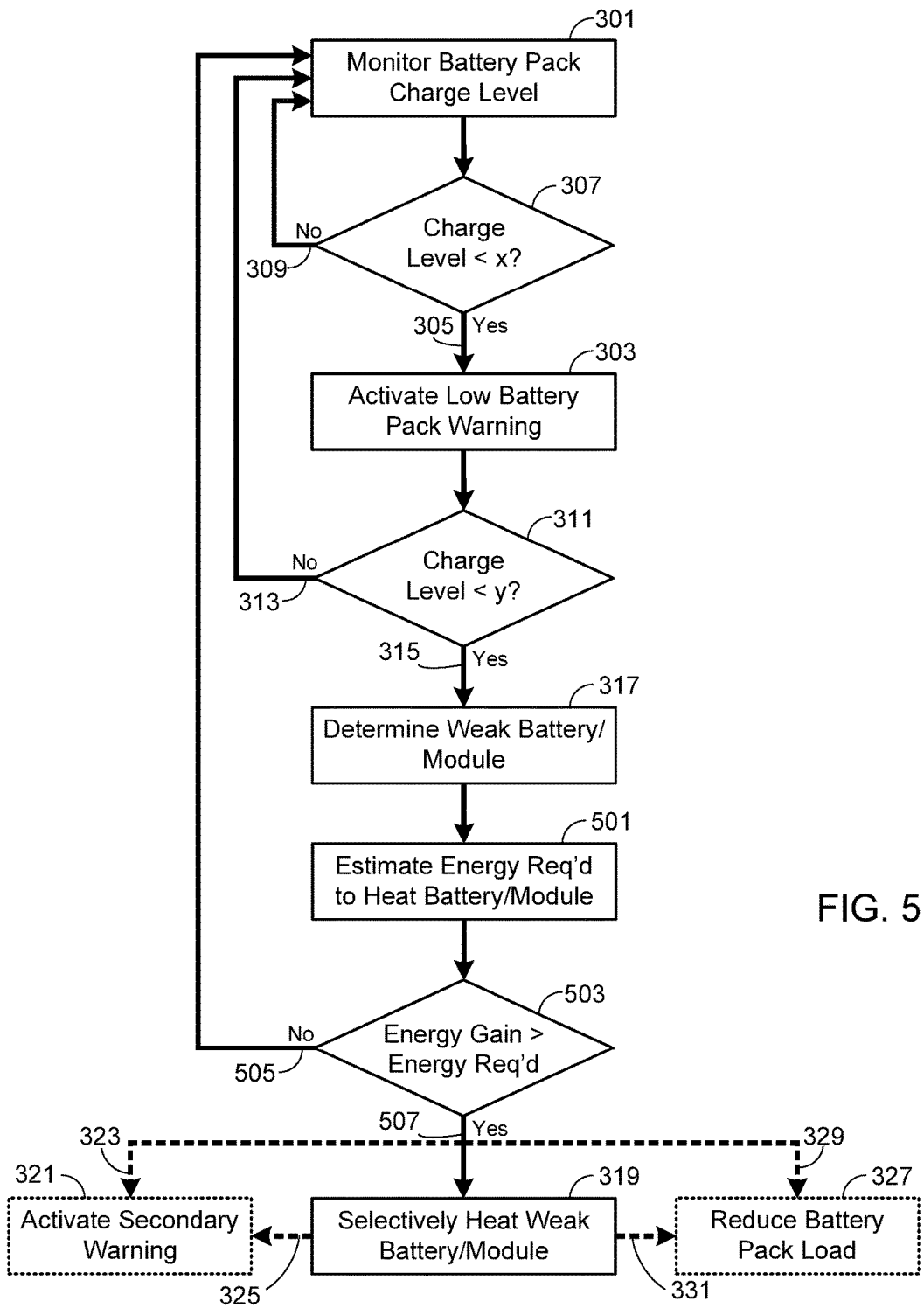
FIG. 5 illustrates a modification of the methodology shown in FIG. 3 in which selective heating of a portion of the battery pack is only performed if it yields an increase in usable energy after taking into account the energy required to perform the heating step.

Depending upon the ambient temperature, the temperature of the battery pack, and the efficiency of heaters 201, in some instances selective heating of the weakest battery or battery module may expedite, rather than delay, termination of vehicle operation due to the amount of energy required to heat the battery/battery module versus the gains to be achieved. Accordingly, in at least one embodiment prior to heating the battery, or battery module, that exhibits the lowest voltage, the system estimates the energy required to heat the identified battery/battery module to the desired temperature (step 501 in FIG. 5). The estimated energy required to heat the battery/battery module is then compared to the expected gain (step 503). The BMS controller may be configured to estimate the expected gain, for example basing the expected gain on the difference between the voltage of the weakest battery/battery module and the voltage of the next weakest battery/battery module. Alternately, the BMS controller may be configured to use a preset value for the expected energy gain, where the preset value is set by the vehicle's manufacturer or a third party and which, for example, is based on the average energy gain in similarly sized and/or aged battery packs.

If the outcome of the comparison performed in step 503 is that the energy required to heat the battery/battery module is greater than the expected gain (step 505), the system continues to operate as normal until either the battery pack is plugged into a charging station or car operation is terminated due to the low charge level of the battery pack. If the outcome of the comparison performed in step 503 is that it would be beneficial to heat the battery/battery module (step 507), then the battery/battery module identified in step 317 is selectively heated (step 319). As previously noted, a secondary warning (step 321) may or may not be activated, depending upon the system's configuration. Similarly, the system may or may not be configured to reduce the load on the battery pack (step 327).

Figure 6:
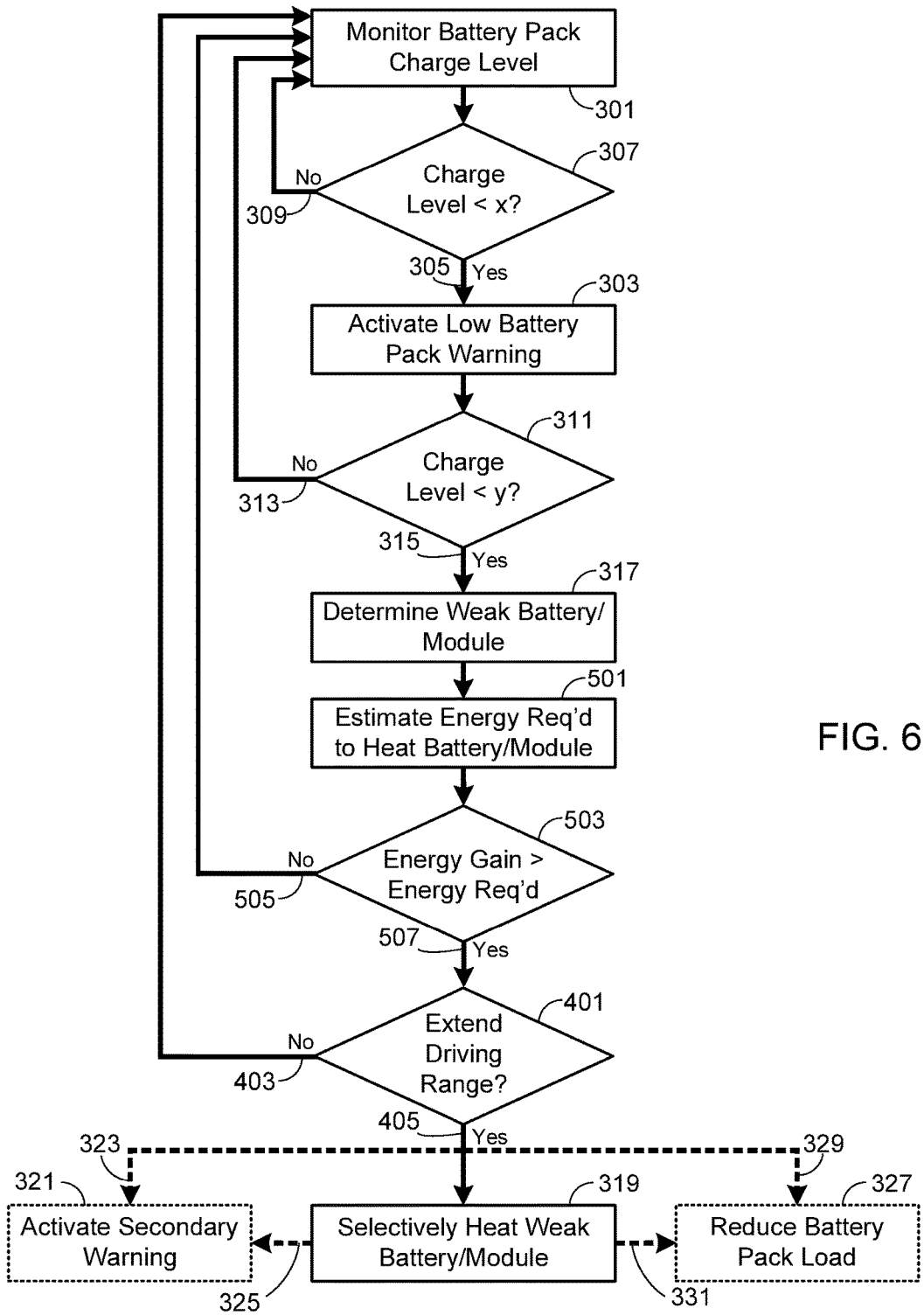
FIG. 6 illustrates an alternate methodology combining the user confirmation aspects of the method of FIG. 4 with the efficiency comparison aspects of the method of FIG. 5.

FIG. 6 illustrates a modified process in which the system requests user confirmation (step 401) prior to heating the weakest battery/battery module. In this embodiment, preferably step 401 is performed after the system determines that it would be beneficial to heat the battery/battery module (step 507), although it should be understood that user confirmation (step 401) may be requested prior to performing the comparison of step 503.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery management system coupled to a battery pack of an electric vehicle, said battery pack coupled to an electric drive train of said electric vehicle, the battery pack comprising a plurality of battery modules, each battery module of said plurality of battery modules comprising at least one battery, said battery management system comprising:

a battery pack thermal control system, said battery pack thermal control system comprising a heating subsystem and a cooling subsystem, wherein said battery pack thermal control system is configured to simultaneously heat said plurality of battery modules with said heating subsystem upon receipt of a heating command, and wherein said battery pack thermal control system is configured to simultaneously cool said plurality of battery modules with said cooling subsystem upon receipt of a cooling command;

a battery module heating system, wherein said battery module heating system is independent of said battery pack thermal control system, wherein said battery module heating system is configured to provide selective heating of a single battery module of said plurality of battery modules, and a battery management system controller, wherein said battery pack thermal control system is coupled to and controlled by said battery management system controller, wherein said battery module heating system is coupled to and controlled by said battery management system controller, said battery management system controller configured to (i) monitor a current battery pack charge level, (ii) determine when said current battery pack charge level falls to a preset level, (iii) determine an output voltage for each battery module of said plurality of battery modules, (iv) identify said single battery module from said plurality of battery modules based on said output voltage, wherein said output voltage of said single battery module is lower than said output voltage of each battery module of a remaining portion of said plurality of battery modules, and (v) selectively heat said single battery module to a higher temperature than said remaining portion of said battery modules when said current battery pack charge level falls to said preset level, wherein said heating step decreases an internal resistance corresponding to said single battery module.

2. The battery management system of claim 1, further comprising a plurality of sensors coupled to said battery management system controller, wherein said plurality of sensors monitor said output voltage corresponding to each of said plurality of battery modules.

3. The battery management system of claim 1, said battery management system controller configured to determine said output voltage corresponding to each of said plurality of battery modules from an internal resistance corresponding to each of said plurality of battery modules.

4. The battery management system of claim 1, further comprising an on-board warning indicator, said battery management system controller configured to activate said on-board warning indicator when said current battery pack charge level falls to said preset level.

5. The battery management system of claim 1, said battery management system controller configured to reduce a load on said battery pack after said current battery pack charge level falls to said preset level.

6. The battery management system of claim 5, said battery management system controller configured to automatically alter a setting of a vehicle auxiliary system in order to reduce said load on said battery pack after said current battery pack charge level falls to said preset level, said vehicle auxiliary system selected from the group consisting of a heating, ventilation and air conditioning (HVAC) system, an external lighting system, an internal lighting system, a navigation system and a vehicle entertainment system.

7. The battery management system of claim 5, said battery management system controller configured to limit a motor load corresponding to said electric drive train in order to reduce said load on said battery pack after said current battery pack charge level falls to said preset level, wherein limiting said motor load reduces an acceleration and a top speed corresponding to said electric vehicle.

8. The battery management system of claim 1, said battery management system controller configured to issue a confirmation request prior to selectively heating said single battery module to said higher temperature, wherein said battery management system controller selectively heats said single battery module after receiving a positive response to said confirmation request, and wherein said battery management system controller does not selectively heat said single battery module after receiving a negative response to said confirmation request.

* * * * *